(12) United States Patent
Huang et al.

(10) Patent No.: US 12,113,456 B2
(45) Date of Patent: Oct. 8, 2024

(54) APPARATUS AND METHOD FOR CONTROLLING DELTA-CONNECTED CASCADED MULTILEVEL CONVERTER

(71) Applicant: ABB Schweiz AG, Baden (CH)

(72) Inventors: Xing Huang, Beijing (CN); Hailian Xie, Beijing (CN); Guangming Pei, Beijing (CN); Hua Wei, Beijing (CN); Min Li, Beijing (CN)

(73) Assignee: ABB SCHWEIZ AG, Baden (CH)

( * ) Notice: Subject to any disclaimer, the term of this patent is extended or adjusted under 35 U.S.C. 154(b) by 80 days.

(21) Appl. No.: 17/753,860

(22) PCT Filed: Feb. 28, 2020

(86) PCT No.: PCT/CN2020/077183
§ 371 (c)(1),
(2) Date: Mar. 16, 2022

(87) PCT Pub. No.: WO2021/168791
PCT Pub. Date: Sep. 2, 2021

(65) Prior Publication Data
US 2022/0407407 A1  Dec. 22, 2022

(51) Int. Cl.
*H02M 7/49* (2007.01)
*H02J 3/01* (2006.01)
(Continued)

(52) U.S. Cl.
CPC .......... *H02M 7/49* (2013.01); *H02M 1/12* (2013.01); *H02M 1/15* (2013.01); *H02J 3/01* (2013.01); *H02M 1/0025* (2021.05); *H02M 5/458* (2013.01)

(58) Field of Classification Search
CPC ........ H02M 1/0025; H02M 1/12; H02M 1/15; H02M 1/0003; H02M 5/458; H02M 7/4835; H02M 7/49; H02J 3/01
See application file for complete search history.

(56) References Cited

U.S. PATENT DOCUMENTS

2013/0051105 A1    2/2013  Wang et al.
2020/0244184 A1*   7/2020  Voegeli .................. H02M 7/49

FOREIGN PATENT DOCUMENTS

CN    102044879 A    5/2011
CN    102545235 A    7/2012
(Continued)

OTHER PUBLICATIONS

Shang, J. et al. "Railway power conditioner based on delta-connected modular multilevel converter," 2016 IEEE Energy Conversion Congress and Exposition (ECCE), Milwaukee, WI, USA, 2016, pp. 1-7, doi: 10.1109/ECCE.2016.7855376. (Year: 2016).*

(Continued)

*Primary Examiner* — Fred E Finch, III
(74) *Attorney, Agent, or Firm* — Greenberg Traurig, LLP

(57) ABSTRACT

Embodiments of present disclosure relate to an apparatus and a method for controlling a delta-connected cascaded multilevel converter. The apparatus (100) for controlling a delta-connected cascaded multilevel converter (110) comprises: a converter controller (102) configured to: receive current signals indicating phase currents flowing through respective phase arms of the converter (110); determine a harmonic current signal indicating a circulating current of the converter (110) from the current signals; and generate, based on the determined harmonic current signal and a reference current signal, a harmonic voltage signal to cause an amplitude of the circulating current flowing through the phase arms of the converter (110) to be a predetermined amplitude.

24 Claims, 9 Drawing Sheets

(51) Int. Cl.
*H02M 1/12* (2006.01)
*H02M 1/15* (2006.01)
*H02M 1/00* (2006.01)
*H02M 5/458* (2006.01)

(56) References Cited

FOREIGN PATENT DOCUMENTS

| CN | 102742142 A | 10/2012 | | |
|---|---|---|---|---|
| CN | 102957151 A | 3/2013 | | |
| CN | 103999339 A | 11/2016 | | |
| CN | 108306320 A | 7/2018 | | |
| EP | 2541752 A1 | 1/2013 | | |
| EP | 2667279 B1 | * | 5/2019 | ............ H02J 3/1857 |
| WO | 2013087110 A1 | 6/2013 | | |
| WO | 2019081503 A1 | 5/2019 | | |

OTHER PUBLICATIONS

Kish, G. J. et al., "The Delta-Configured Modular Multilevel Converter," in IEEE Transactions on Power Delivery, vol. 31, No. 3, pp. 1060-1067, Jun. 2016, doi: 10.1109/TPWRD.2015.2392780. (Year: 2016).*

International Search Report and Written Opinion, issued by the ISA/CN National Intellectual Property Administration, regarding corresponding patent application Serial No. PCT/CN2020/077183; dated Nov. 27, 2020; 9 pages.

Song et al.; Optimization of the Triple-Harmonic Circulating Current for Delta-Connected Cascaded STATCOM; Power System Technology; vol. 39, No. 8, Aug. 2015; Tsinghua University; China; pp. 2364-2370, plus refs. (Abstract in English).

Mei et al.; Circulating Current Control of the Delta-connected Cascaded STATCOM; Proceedings of the CSEE; vol. 34, No. 36, Dec. 25, 2014; Tsinghua University; Chin. Soc. for Elec. Eng .; China; pp. 6398-6406, plus refs. (Abstract in English).

1 Chinese Office Action dated Jul. 16, 2023 for Chinese application No. 202080064922.2; 7-pages.

Oghorada, et al. "Unbalanced and Reactive Load Compensation using MMCC-based SATCOMs with Third Harmonic Injection", EEE Transactions on Industrial Electronics, 2019, vol. 66, pp. 2891-2902.

Pereira, et al. "Circulating Current Suppression Strategies for D-STATCOM Based on Modular Multilevel Converters", 13th IEEE Brazilian Power Electronics Conference and 1st Southern Power Electronics Conference, COBEP/SPEC 2016.

* cited by examiner

APPARATUS AND METHOD FOR CONTROLLING DELTA-CONNECTED CASCADED MULTILEVEL CONVERTER

CROSS-REFERENCE TO RELATED APPLICATIONS

This is a national stage application which claims priority to International patent application Serial No.: PCT/CN2020/077183, filed on Feb. 28, 2020; and which is herein incorporated by reference in its entirety.

FIELD

Embodiments of the present disclosure generally relate to the field of cascaded multilevel converter, and particularly to an apparatus and a method for controlling a delta-connected cascaded multilevel converter.

BACKGROUND

Cascaded multilevel converters are promising candidates for solutions of drive and power distribution systems. The cascaded multilevel converters may easily operate at medium and high voltages based on a series connection of power modules or cells. Delta-connected cascaded multilevel converters have been advantageously applied for controlling unbalanced power loads. However, the delta-connected cascaded multilevel converter has a disadvantage that there is a circulating current flowing through three phase arms. The circulating current may lead to problems such as a decrease of converter efficiency, etc.

To solve this problem, there may be two kinds of alternative solutions. Some converter topologies such as a topology of Y-connected cascaded multilevel converter can naturally limit the circulating current flowing through three phase arms, because there is no circuit path for the circulating current in these converter topologies. However, under the same voltage level and power scale, a rated current of each converter cell in the Y-connected cascaded multilevel converter is much greater than that of the delta-connected cascaded multilevel converter. To avoid a parallel operation of semiconductor devices, it may be recommended to use a topology of the delta-connected cascaded multilevel converter for a large scale power application.

For the topology of the delta-connected cascaded multilevel converter, some conventional solutions have been proposed to limit the circulating current. However, control methods in the conventional solutions are directed to a static synchronous compensator (STATCOM), and cannot be directly applied for a voltage drive.

It is desirable to provide an improved control solution for the circulating current of the delta-connected cascaded multilevel converter in the voltage drive application.

SUMMARY

Embodiments of the present disclosure are directed to an apparatus and a method for controlling a delta-connected cascaded multilevel converter, which is capable of improving a power capacity in a voltage drive.

In a first aspect, embodiments of the present disclosure provide an apparatus for controlling a delta-connected cascaded multilevel converter. The apparatus comprises a converter controller, the converter controller is configured to: receive current signals indicating phase currents flowing through respective phase arms of the converter; determine a harmonic current signal indicating a circulating current of the converter from the current signals; and generate, based on the determined harmonic current signal and a reference current signal, a harmonic voltage signal to cause an amplitude of the circulating current flowing through the phase arms of the converter to be a predetermined amplitude.

Compared with the conventional solutions, the apparatus according to the embodiments of the present disclosure controls the circulating current having a desired amplitude to be injected into the phase arms, so as to extend a rated power range of the converter, with little or even no modification on a hardware system of the converter. In this way, the power range is extended with minimum material cost of the converter.

In some embodiments, the converter controller is configured to: determine the harmonic current signal indicating a third order harmonic circulating current of the converter from the current signals; and generate the harmonic voltage signal to cause the amplitude of the third order harmonic circulating current to be 0.167 times of the amplitude of the rated current of the converter.

In some embodiments, the converter controller is further configured to: receive a phase voltage reference signal associated with a load electrically coupled to the converter; and generate, by combining the harmonic voltage signal with the phase voltage reference signal, a control signal for controlling the converter to cause a peak amplitude of the phase currents to be a first amplitude, wherein the first amplitude is associated with a second amplitude of the circulating current in the phase currents.

In some embodiments, the converter controller is configured to generate the harmonic voltage signal based on a comparison of the harmonic current signal and the reference current signal.

In some embodiments, the converter controller is configured to: determine a first DC component of the harmonic current signal from the current signals; compare the first DC component with a first reference DC component of the reference current signal to generate a first DC difference; determine a second DC component of the harmonic current signal from the current signals; compare the second DC component with a second reference DC component of the reference current signal to generate a second DC difference; and generate the harmonic voltage signal based on the first DC difference and the second DC difference.

In some embodiments, the first reference DC component of the reference current is set to be 0.167 times of an amplitude of a rated current of the converter, and the second reference DC component of the reference current is set to be zero.

In some embodiments, the converter controller is configured to: determine a first AC component of the harmonic current signal from the current signals; compare the first AC component with a first reference AC component of the reference current signal to generate a first AC difference; determine a second AC component of the harmonic current signal from the current signals; compare the second AC component with a second reference AC component of the reference current signal to generate a second AC difference; and generate the harmonic voltage signal based on the first AC difference and the second AC difference.

In some embodiments, the apparatus further comprises: a cell controller configured to control, based on a cell control signal generated from the control signal, one of a plurality of converter cells in the phase arm to cause the amplitude of the circulating current to be the predetermined amplitude.

In some embodiments, the cell controller is further configured to: receive a DC voltage value indicating a DC voltage across a capacitor in the one of the plurality of converter cells; compare the DC voltage value with a nominal value to generate a compensation factor; and control the one of the plurality of converter cells based on the generated compensation factor and the cell control signal.

In some embodiments, the cell controller is configured to generate the compensation factor by dividing the DC voltage value by the nominal value.

In some embodiments, the cell controller is configured to: determine a compensated control signal by dividing a level of the cell control signal by the compensation factor; and control the one of the plurality of converter cells based on the compensated control signal.

In a second aspect, embodiments of the present disclosure provide a method for controlling a delta-connected cascaded multilevel converter. The method comprises: receiving current signals indicating phase currents flowing through respective phase arms of the converter; determining a harmonic current signal indicating a circulating current of the converter from the current signals; and generating, based on the determined harmonic current signal and a reference current signal, a harmonic voltage signal to cause an amplitude of the circulating current flowing through the phase arms of the converter to be a predetermined amplitude.

In some embodiments, determining the harmonic current signal indicating the circulating current comprises determining the harmonic current signal indicating a third order harmonic circulating current, and generating the harmonic voltage signal to cause the amplitude of the circulating current to be the predetermined amplitude comprises generating the harmonic voltage signal to cause the amplitude of the third order harmonic circulating current to be 0.167 times of the amplitude of the rated current of the converter.

In some embodiments, the method further comprises: receiving a phase voltage reference signal associated with a load electrically coupled to the converter; and generating, by combining the harmonic voltage signal with the phase voltage reference signal, a control signal for controlling the converter to cause a peak amplitude of the phase currents to be a first amplitude, wherein the first amplitude is associated with a second amplitude of the circulating current in the phase currents.

In some embodiments, generating the harmonic voltage signal comprises generating the harmonic voltage signal based on a comparison of the harmonic current signal and the reference current signal.

In some embodiments, generating the harmonic voltage signal based on the comparison comprises: determining a first DC component of the harmonic current signal from the current signals; comparing the first DC component with a first reference DC component of the reference current signal to generate a first DC difference; determining a second DC component of the harmonic current signal from the current signals; comparing the second DC component with a second reference DC component of the reference current signal to generate a second DC difference; and generating the harmonic voltage signal based on the first DC difference and the second DC difference.

In some embodiments, comparing the first DC component with the first reference DC component comprises comparing the first DC component with an amplitude of 0.167 times of a rated current of the converter, and wherein comparing the second DC component with the second reference DC component comprises comparing the second DC component with zero.

In some embodiments, generating the harmonic voltage signal based on the comparison comprises: determining a first AC component of the harmonic current signal from the current signals; comparing the first AC component with a first reference AC component of the reference current signal to generate a first AC difference; determining a second AC component of the harmonic current signal from the current signals; comparing the second AC component with a second reference AC component of the reference current signal to generate a second AC difference; and generating the harmonic voltage signal based on the first AC difference and the second AC difference.

In some embodiments, the method further comprises: controlling, based on a cell control signal generated from the control signal, one of a plurality of converter cells in the phase arm to cause the amplitude of the circulating current to be the predetermined amplitude.

In some embodiments, the method further comprises: receiving a DC voltage value indicating a DC voltage across a capacitor in the one of the plurality of converter cells; comparing the DC voltage value with a nominal value to generate a compensation factor; and controlling the one of the plurality of converter cells based on the generated compensation factor and the cell control signal.

In some embodiments, generating the compensation factor comprises generating the compensation factor by dividing the DC voltage value by the nominal value.

In some embodiments, controlling the one of the plurality of converter cells comprises: determining a compensated control signal by dividing a level of the cell control signal by the compensation factor; and controlling the one of the plurality of converter cells based on the compensated control signal.

In a third aspect, embodiments of the present disclosure provide a system for controlling a delta-connected cascaded multilevel converter. The system comprises: the apparatus as described above; a first controller configured to generate a phase voltage reference signal based on a load electrically coupled to the converter; and a second controller configured to generate a plurality of cell control signals for the plurality of converter cells based on the harmonic voltage signal.

In a fourth aspect, embodiments of the present disclosure provide a computer readable medium having instructions stored thereon. The instructions, when executed on at least one processor, cause the at least one processor to carry out the method as described above.

According to the embodiments of the present disclosure, the circulating current of the delta-connected cascaded multilevel converter is controlled to have the desired amplitude and to be injected into the phase arms. As such, the power capacity of the delta-connected cascaded multilevel converter is improved with a little or even no modification on the hardware system, and a voltage fluctuation of the DC capacitor in each converter cell is reduced to extend a working lifetime of the DC capacitor. In this way, the manufacturing cost of the delta-connected cascaded multilevel converter can be saved, the lifetime of the DC capacitor is extended, and the maintenance cost of the DC capacitor is reduced.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. For a more complete understanding of the present

DETAILED DESCRIPTION

Figure 1:
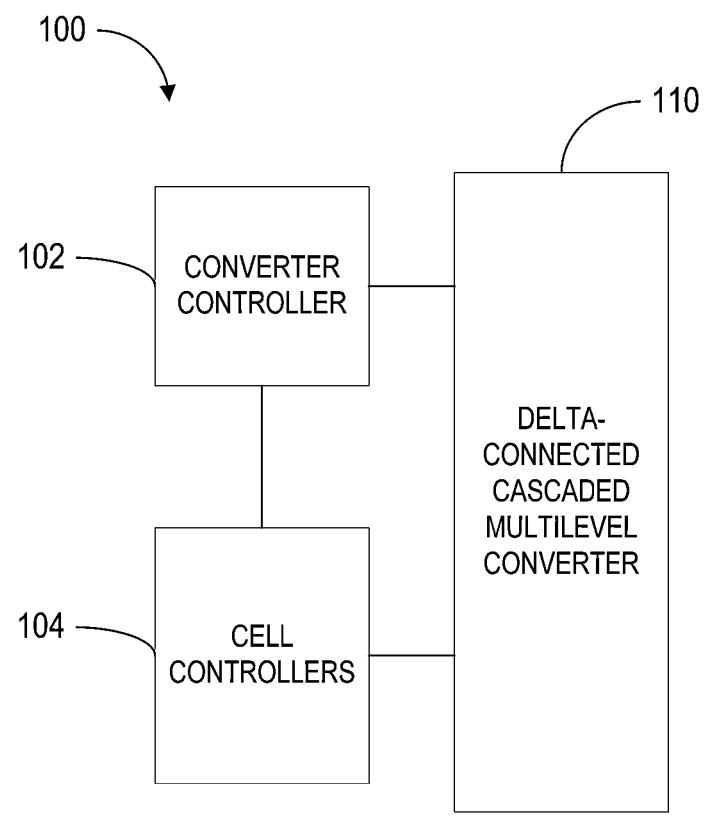
FIG. 1 illustrates a block diagram of an apparatus for controlling a delta-connected cascaded multilevel converter according to an embodiment of the present disclosure.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "one embodiment" and "an embodiment" are to be read as "at least one embodiment." The term "another embodiment" is to be read as "at least one other embodiment." Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the Figures. Other explicit and implicit definitions may be included below.

In conventional solutions as mentioned above, a method for controlling the circulating current in the STATCOM has been proposed for operating the STATCOM in unbalanced voltage status. Although the conventional solution utilizes the topology of the delta-connected converter, there is no AC source and rectifier circuit in each converter cell. Therefore, this topology can be used for only STATCOM, but cannot be directly applied for the voltage drive such as a middle voltage (MV) drive. The conventional solutions do not mention to inject the circulating current for power capacity extension. The STATCOM only considers the reactive power generation, while the MV drive application needs consideration of both active and reactive power generation. This means that the voltage fluctuation of the DC capacitor for the MV drive application is greater than that for the STATCOM application for the same voltage range and power scale. Therefore, the circulating current control of delta-connected cascaded multilevel converter for the MV drive application is more complexed.

In view of the above, embodiments of the present disclosure provide an improved solution for controlling the circulating current of the delta-connected cascaded multilevel converter, which may be applied for the voltage drive and help to improve the power capacity of the cascaded multilevel converter with little or even no modification on the hardware system thereof.

According to some embodiments, the circulating current is controlled by a converter controller to have a desired amplitude and to be injected into phase arms of the delta-connected cascaded multilevel convertor. The converter controller determines the circulating current flowing through the phase arms of the delta-connected cascaded multilevel convertor, and controls the circulating current in a closed-loop manner such that the circulating current flowing through the phase arms of the delta-connected cascaded multilevel converter is controlled to have a desired amplitude. In this way, the circulating current having the desired amplitude is injected into the phase arms to obtain a desired phase current, thereby extending the rated power range of the delta-connected cascaded multilevel converter.

Hereinafter, the embodiments of the present disclosure will be described in detail with reference to the accompanying drawings.

FIG. 1 illustrates a block diagram of an apparatus 100 for controlling a delta-connected cascaded multilevel converter 110. The apparatus 100 comprises a converter controller 102.

The converter controller 102 is configured to receive current signals indicating phase currents flowing through respective phase arms of the converter 110. In some embodiments, the converter 110 comprises three phase arms connected with each other in a delta shape. In some embodiments, the converter controller 102 receives the current signals from current sensors, respectively. The current sensor is electrically coupled to the phase arm, and senses the phase current to generate the current signal representing the phase current. In some embodiments, the current sensor may be included in the converter controller 102. In other embodiments, the current sensor may be provided outside of the converter controller 102.

Moreover, the converter controller 102 is configured to determine a harmonic current signal indicating a circulating current of the converter 110 from the current signals. The circulating current flows in the converter 110 in a clockwise direction or a counterclockwise direction. The converter controller 102 calculates the harmonic current signal from the received current signals representing actual phase currents of the respective phase arms. In some embodiments, the converter controller 102 may determine the harmonic current signal indicating a third order harmonic circulating current of the converter 110 from the current signals. In other embodiments, the converter controller 102 may determine the harmonic current signal indicating any order harmonic circulating current.

Further, the converter controller 102 is configured to generate a harmonic voltage signal based on the determined harmonic current signal and a reference current signal. The harmonic voltage signal causes an amplitude of the circulating current flowing through the phase arms of the converter to be below a predetermined amplitude. In some embodiments, the amplitude of the circulating current may be controlled to be a predefined amplitude. In other embodiments, the amplitude of the circulating current may be controlled to be zero. In some embodiments, the converter controller 102 generates the harmonic voltage signal to cause the amplitude of the third order harmonic circulating current to be the predetermined amplitude. In other embodiments, the converter controller 102 generates the harmonic voltage signal to cause the amplitude of any order harmonic circulating current to be the predetermined amplitude.

In some embodiments, the converter controller 102 generates the harmonic voltage signal based on a comparison of the harmonic current signal and the reference current signal. In some embodiments, the converter controller 102 compares DC components of the harmonic current signal with DC components of the reference current signal. In other embodiments, the converter controller 102 compares AC components of the harmonic current signal with AC components of the reference current signal.

According to the embodiments, the converter controller 102 generates the harmonic voltage signal to control the circulating current in a closed-loop manner. Under this control, the circulating current which flows in the phase arms of the converter 110 may be controlled at a predefined amplitude. In some embodiments, the amplitude of the third order harmonic circulating current is controlled to be 0.167 times of an amplitude of a rated current of the converter 110. If the rated current of the converter 110 is set to be 1 pu, the amplitude of the third order harmonic circulating current is maintained at 0.167 pu.

In some embodiments, the converter controller 102 is further configured to receive a phase voltage reference signal associated with a load electrically coupled to the converter 110. The phase voltage reference signal is generated for controlling converter cells in the phase arm of the converter 110 to generate output currents which are set to meet demands of the load.

In some embodiments, the converter controller 102 is further configured to generate a control signal by combining the harmonic voltage signal with the phase voltage reference signal. The control signal is used for controlling the converter 110 to cause a peak amplitude of the phase currents to be a first amplitude. The converter controller 102 may comprise a combiner or adder for combining the harmonic voltage signal with the phase voltage reference signal. The first amplitude is associated with a second amplitude of the circulating current in the phase currents. As such, the control signal is generated for controlling the converter cells of the converter 110, so that the phase current of the phase arm into which the circulating current with the desired amplitude is injected flows in the converter 110.

In some embodiments, the peak value of the phase current or combined phase current reaches to 0.866 pu when the third order harmonic circulating current having the amplitude of 0.167 pu is injected into the phase arms. As such, 1/0.866≈1.155 means that the injection of the third order harmonic circulating current can help the converter 110 to get approximately 15.5% extra power. In this way, the rated power range of the converter 110 is extended, and the power capacity of the converter 110 is improved. Moreover, since the peak value of the combined phase current is reduced, the voltage fluctuation of DC capacitors in each converter cell in the phase arms of converter 110 is decreased.

In some embodiments, the apparatus 100 may further comprise converter cells 104. Each of the cell controllers 104 is configured to control corresponding one of the converter cells 202 in the phase arm based on a corresponding cell control signal generated from the control signal. This control causes the amplitude of the circulating current to be the predetermined amplitude. The cell control signals are generated based on the control signal, and the cell control signals are generated for the converter cells, respectively. In some embodiments, the cell controller 104 generates PWM signals based on the cell control signal, and controls the converter cell by the PWM signals such that the amplitude of the circulating current is controlled at the predefined amplitude. In some embodiments, the converter cells are controlled by the cell control signals such that the amplitude of the third order harmonic circulating current is controlled at the amplitude of 0.167 pu.

In some embodiments, the cell controller 104 is further configured to receive a DC voltage value indicating a DC voltage across the DC capacitor in the converter cell. The cell controller 104 compares the DC voltage value with a nominal value to generate a compensation factor, and controls the converter cell based on the generated compensation factor and the cell control signal. As such, the cell controller 104 may compensate for the cell control signal based on the DC voltage value, and controls the converter cells based on the compensated control signal. In this way, the voltage fluctuation of the DC capacitor in each converter cell is further reduced, thereby further extending the working lifetime of the DC capacitor.

Figure 2:
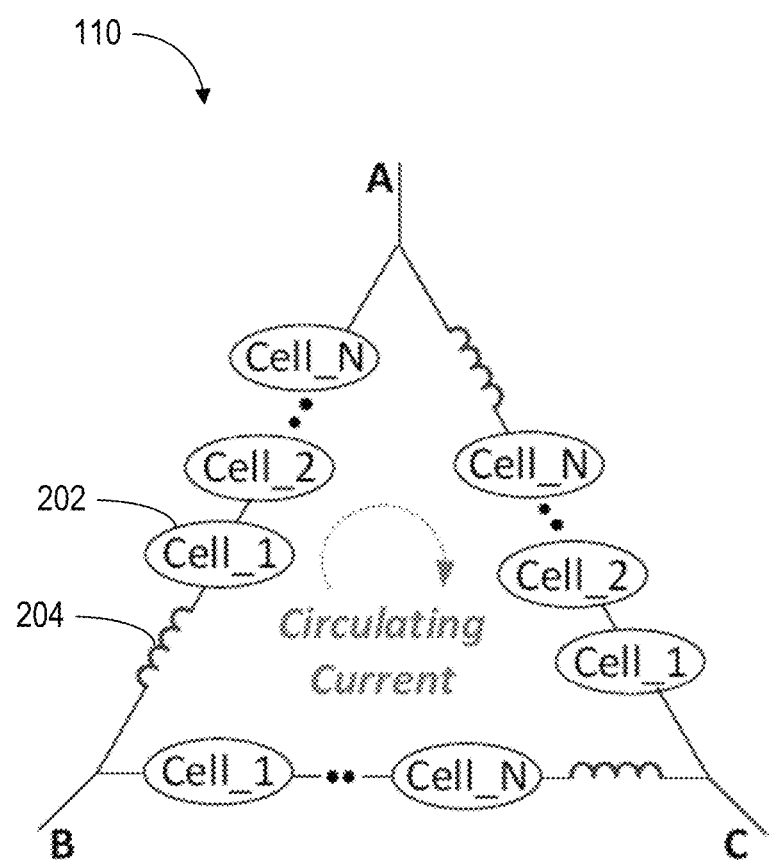
FIG. 2 illustrates a circuit diagram of a delta-connected cascaded multilevel converter.

FIG. 2 illustrates a circuit diagram of the delta-connected cascaded multilevel converter 110. The converter topology of the delta-connected cascaded multilevel converter for MV drive is shown in FIG. 2. The converter 110 comprises three phase arms which are respectively connected between terminals A and B, between terminals B and C, and between terminals C and A. The converter 110 comprises a plurality of converter cells 202 in each phase arm. The plurality of converter cells 202 are cascaded in each phase arm. The converter 110 may further comprise an arm inductor 204 in each phase arm. As shown in FIG. 2, the circulating current flows in the phase arms of the converter 110. Generally, this circulating current is caused by multiple reasons, including transformer symmetry tolerance (TST), DC voltage ripple in each cell, etc. In some embodiments, the circulating current flows in a clockwise direction as shown in FIG. 2. In other embodiments, the circulating current may flow in a counterclockwise direction.

Figure 3:
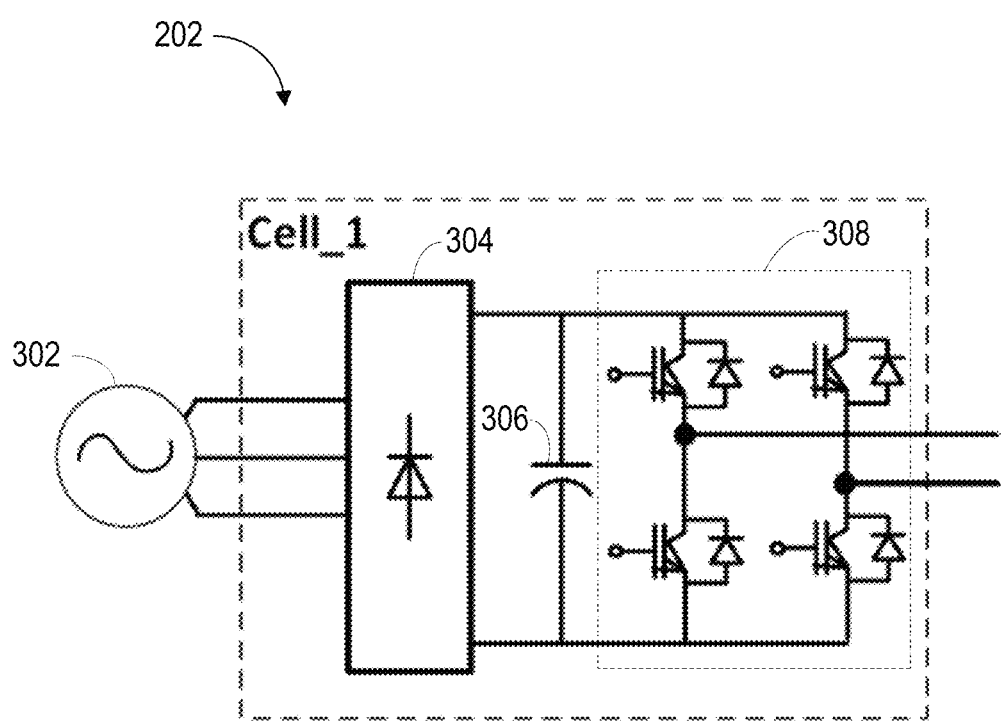
FIG. 3 illustrates a circuit diagram of a converter cell of a delta-connected cascaded multilevel converter.

FIG. 3 illustrates a circuit diagram of the converter cell 202 of the delta-connected cascaded multilevel converter 110. As shown in FIG. 3, the converter cell 202 comprises an AC source 302, a rectifying circuit 304, a capacitor 306, and a bridge circuit 308. The rectifying circuit 304 comprises diodes to rectify an AC current supplied from the AC source 302 to generate a DC current. The capacitor 306 outputs a DC voltage to the bridge circuit 308. The bridge circuit 308 outputs a converted AC current from the DC voltage. In some embodiments, the bridge circuit 308 may comprise a full-bridge circuit as shown in FIG. 3. In other embodiments, the bridge circuit 308 may comprise a half-bridge circuit. The bridge circuit 308 comprises transistors which receive PWM signals for outputting a desired AC current or voltage.

In some embodiments, the cell controller 104 generates the PWM signals based on the cell control signal, and outputs the PWM signals to the transistors to control switching of the transistors. As such, the cell controller 104 controls output currents of the transistors based on the cell control signal. The circulating current is combined into the output currents, and the combined currents flow in the phase arms. In addition, the converter controller 102 generates the control signal based on the circulating current in the output currents. The cell control signals are generated for the converter cells 202, respectively, based on the control signal. As such, the converter controller 102 generates the control signal for controlling the converter cells 202 by the respective cell controllers 104, such that the circulating current in the output currents is controlled at the desired amplitude. That is, the converter controller controls the circulating current in the closed-loop manner, such that the amplitude of the circulating current is maintained at the desired value. In this way, the circulating current having the desired amplitude is injected into the phase arms of the converter 110.

Figure 4:
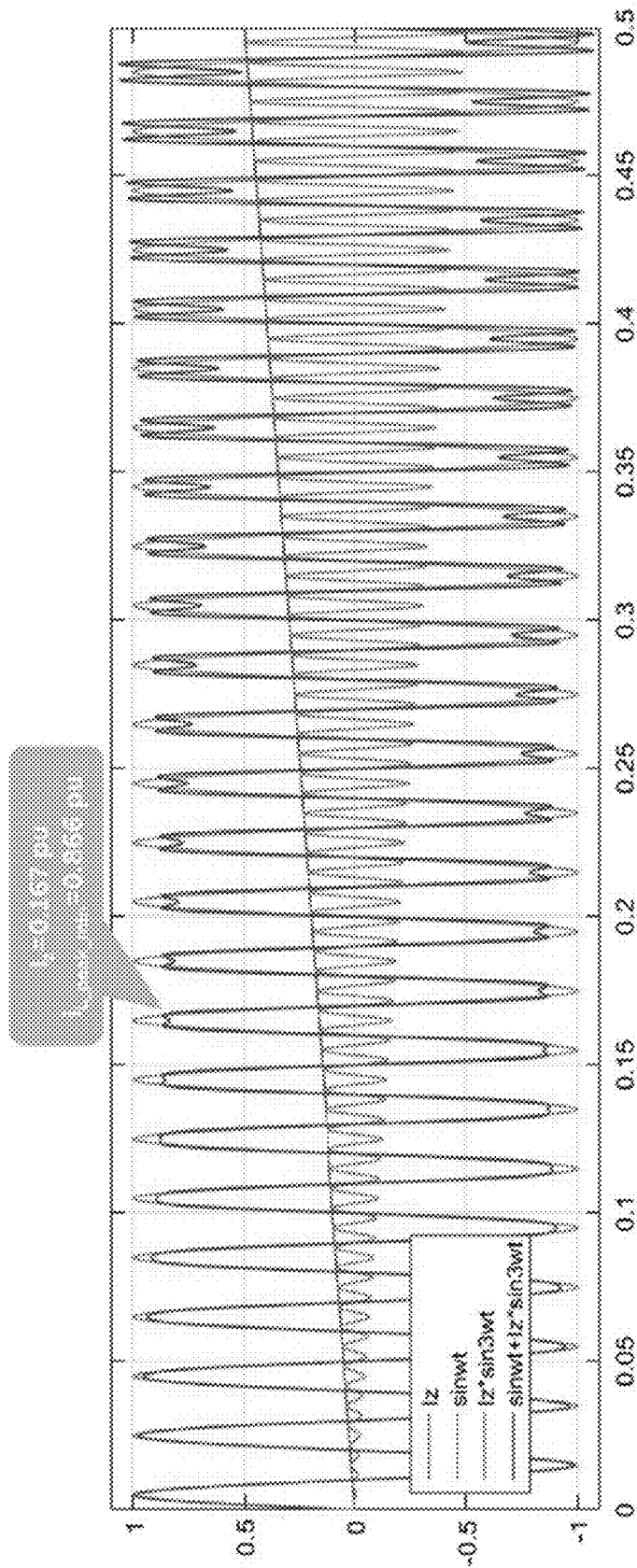
FIG. 4 illustrates a graph showing a third order harmonic circulating current of a delta-connected cascaded multilevel converter.

FIG. 4 illustrates a graph showing the third order harmonic circulating current of the delta-connected cascaded multilevel converter 110. In waveforms shown in FIG. 4, sin wt represents rated output currents of the transistors in the converter cells 202, and Iz*sin 3wt represents the third order harmonic circulating current flowing in the converter 110, where Iz represents the amplitude of the third order harmonic circulating current injected into converter 110. Moreover, $i_L$(=sin wt+Iz*sin 3wt) represents the phase current flowing though the three phase arms in the converter 110.

As shown in FIG. 4, along with the increase of Iz from 0 pu to 1 pu, the peak value of $i_L$ decreases firstly and then increases secondly. According to formula calculating, when Iz=0.167 pu, the peak value of the phase current $i_{L\_peak}$ can reach to the minimum value as 0.866 pu. Further, 1/0.866≈1.155 means that, the injection of the third order harmonic circulating current having the amplitude of 0.167 pu (i.e., Iz=0.167 pu) can help the converter 110 to get approximately 15.5% extra power. In this way, the power capacity of the converter 110 is improved, even by keeping original power components of the converter 110 unchanged. Furthermore, since the peak value of the phase current $I_{L\_peak}$ is reduced, the voltage fluctuation of DC capacitors in each converter cell is decreased.

Figure 5:
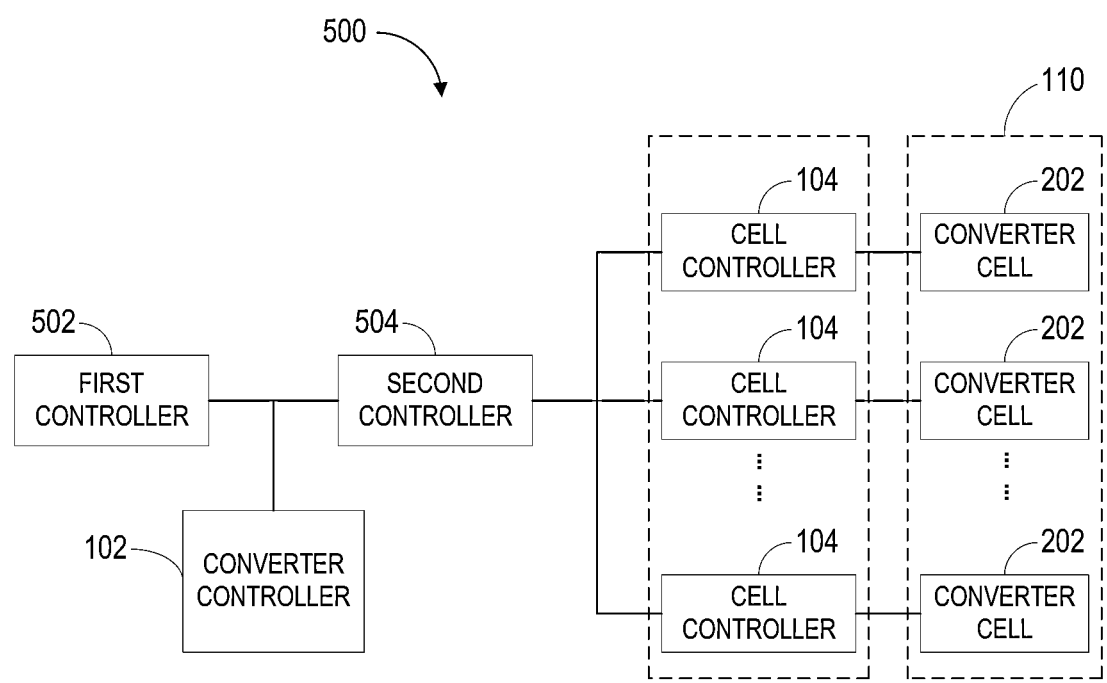
FIG. 5 illustrates a block diagram of a system for controlling a delta-connected cascaded multilevel converter according to an embodiment of the present disclosure.

FIG. 5 illustrates a block diagram of a system 500 for controlling the delta-connected cascaded multilevel converter 110 according to an embodiment of the present disclosure. In some embodiments, the system 500 comprises a first controller 502, a second controller 504, and the apparatus 100 as described with reference to FIG. 1. In some embodiments, the system 500 comprises the first controller 502, the second controller 504, the converter controller 102, and the cell controllers 104.

In some embodiments, the first controller 502 is configured to generate the phase voltage reference signal associated with the load electrically coupled to the converter 110. In some embodiments, the phase voltage reference signal is associated with motor model flux and torque, and the first controller 502 generates the phase voltage reference signal based on the calculated motor model flux and torque, and associated reference signals. The phase voltage reference signal is generated for controlling the converter cells 202 to supply the output power associated with the load.

In some embodiments, the second controller 504 is configured to generate the plurality of cell control signals for the plurality of converter cells 202 based on the harmonic voltage signal. The phase voltage reference signal generated by the first controller 502 is combined with the harmonic voltage signal generated by the converter controller 102 to generate the control signal. The second controller 504 receives the control signal and generates the plurality of cell control signals based on the control signal. In some embodiments, an adder is provided outside of the converter controller 102, and the adder is configured to combine the phase voltage reference signal with the harmonic voltage signal. In other embodiments, an adder is provided in the converter controller 102 to combine the phase voltage reference signal with the harmonic voltage signal.

In some embodiments, the second controller 504 generates the respective cell control signals based on the converter cells 202 included in the converter 110. In some embodiments, the second controller 504 provides an interface between the converter controller 102 and the cell controllers 104. The second controller 504 distributes the respective cell control signals applicable for controlling the converter cells 202 to the cell controllers 104.

In some embodiments, the plurality of the cell controllers 104 are provided to correspond to the plurality of converter cells 202 included in the converter 110, respectively. Each of the cell controllers 104 receives the corresponding cell control signal from the second controller 504 to generate the PWM signals based on the cell control signal. Further, each of the cell controllers 104 sends the PWM signals to the corresponding converter cell 202, and controls the switching of the transistors in the converter cell 202 to generate the output current. As such, the converter cells 202 of the converter 110 are controlled based on the control signal generated by combining the harmonic voltage signal, to cause the circulating current to have the predefined amplitude. In this way, the phase current obtained by combining the circulating current with the output currents is controlled to have the predefined peak amplitude.

Figure 6:
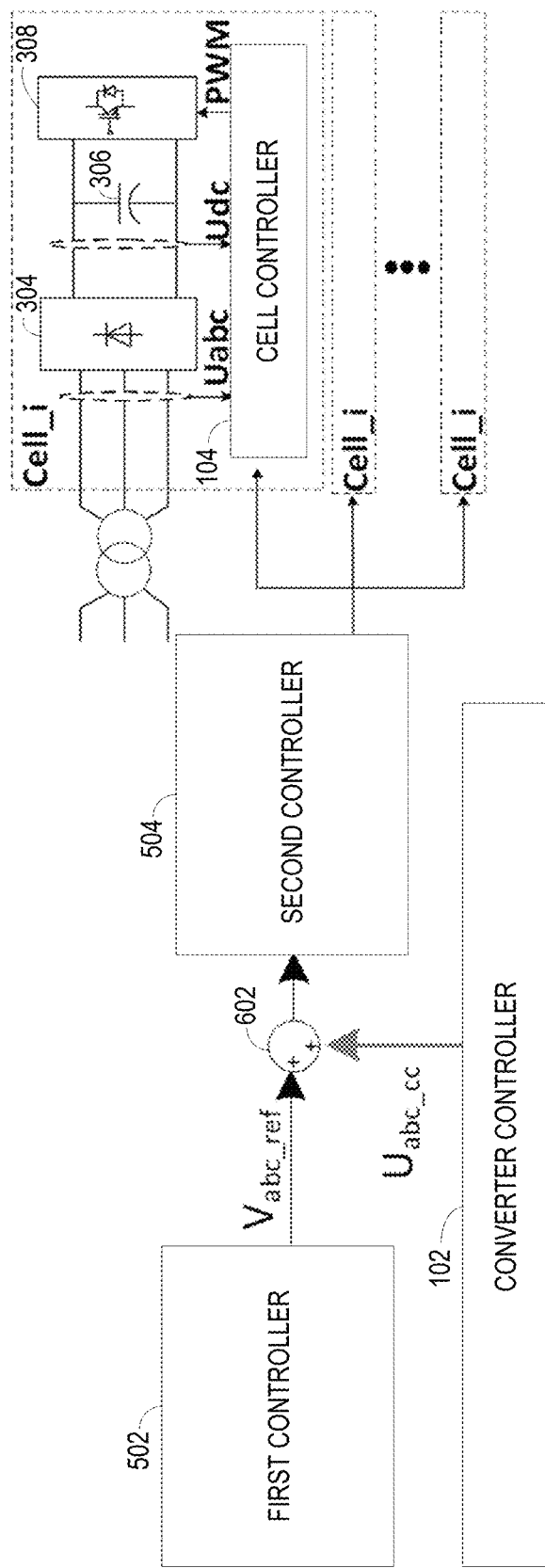
FIG. 6 illustrates a block diagram of an apparatus for controlling a circulating current of a delta-connected cascaded multilevel converter according to an embodiment of the present disclosure.

FIG. 6 illustrates a block diagram of the apparatus 100 for controlling the circulating current of the delta-connected cascaded multilevel converter 110 according to an embodiment of the present disclosure.

The first controller 502 generates the phase voltage reference signal $V_{abc\_ref}$, and the converter controller 102 generates the harmonic voltage signal $U_{abc\_ref}$. In some embodiments, the adder 602 is provided outside of the converter controller 102, and combines the phase voltage reference signal $V_{abc\_ref}$ with the harmonic voltage signal $U_{abc\_ref}$ to generate the control signal, as shown in FIG. 6. In other embodiments, the adder 602 is included in the converter controller 102.

The second controller 504 receives the control signal from the adder 602 to generate the respective cell control signals for the converter cells 202.

The cell controllers 104 receive the cell control signals from the second controller 504, respectively, to generate the PWM signals for controlling the respective bridge circuits 308 in the converter cells 202. In some embodiments, the cell controller 104 is further configured to receive a DC voltage value Udc indicating a DC voltage across the capacitor 306 in the converter cells 202. The cell controller 104 is configured to compares the DC voltage value Udc with a nominal value to generate a compensation factor. Further, the cell controller 104 is configured to control the converter cells 202 based on the generated compensation factor and the cell control signal.

In some embodiments, the cell controller 104 is configured to generate the compensation factor by dividing the DC voltage value by the nominal value. The cell controller 104 is configured to determine a compensated control signal by dividing a level of the cell control signal by the compensation factor, and to control the converter cell 202 based on the compensated control signal. The compensated PWM signal as the compensated control signal is provided to the bridge circuit 308 to control the output currents. In this way, the voltage fluctuation of the capacitor 306 in each converter cell 202 is further reduced, thereby further extending the working lifetime of the DC capacitor.

Figure 7:
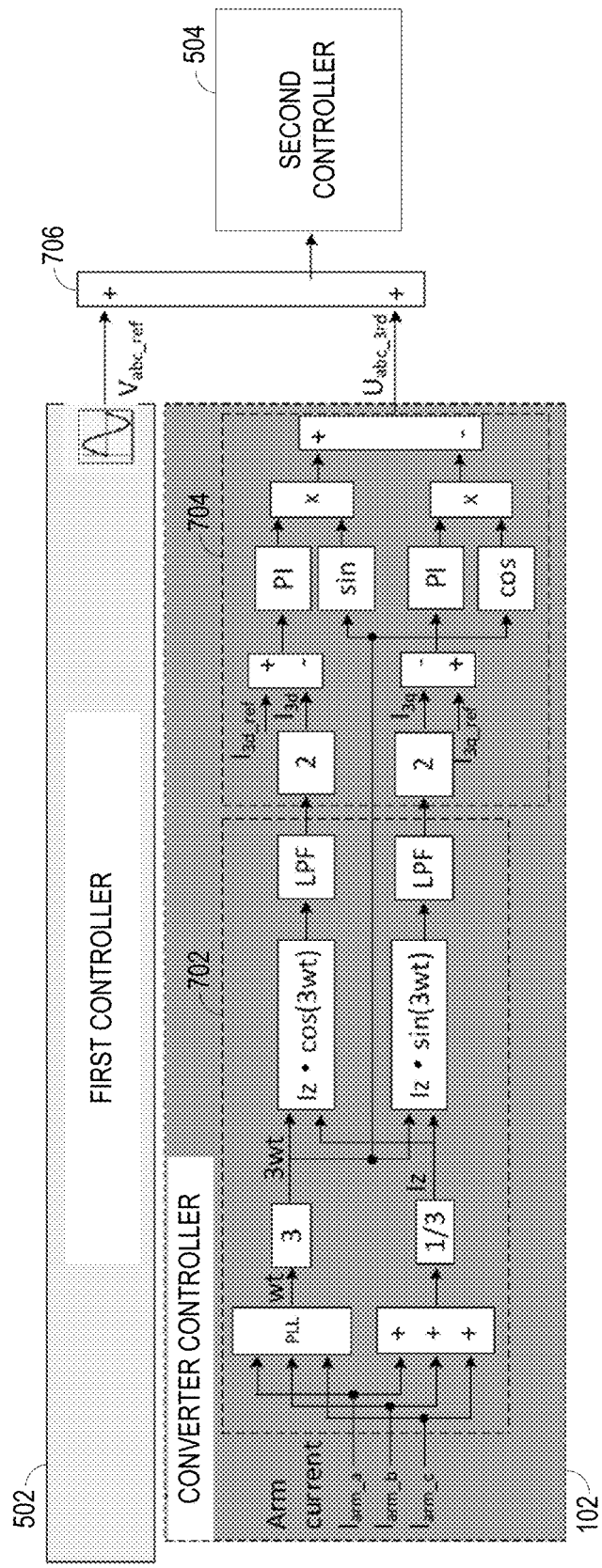
FIG. 7 illustrates a block diagram of a converter controller according to an embodiment of the present disclosure.

FIG. 7 illustrates a block diagram of the converter controller 102 according to an embodiment of the present disclosure. As shown in FIG. 7, the converter controller 102 may comprise a calculation module 702 and a reference voltage generation module 704.

In some embodiments, the calculation module 702 receives the current signals $I_{arm\_a}$, $I_{arm\_b}$, and $I_{arm\_c}$ indicating the phase currents flowing through the arm inductors. The current signal may be measured by current sensors. As shown in FIG. 7, the calculation module 702 may comprise a phase locked loop (PLL) unit to obtain a fundamental phase angle wt of the output currents, and then may generate a phase angle 3wt of the third order harmonic circulating current. The calculation module 702 may further comprise an average unit to obtain the amplitude of the third order harmonic circulating current. The calculation module 702 may further comprise a conversion unit to obtain DC and AC components of the third order harmonic circulating current. The calculation module 702 may further low-pass filters (LPFs) to obtain the DC components of the third order harmonic circulating current $I_{3d}$, $I_{3q}$. $I_{3d}$ and $I_{3q}$ are Iz in DQ frame. $I_{3d\_ref}$ and $I_{3q\_ref}$ are reference DC component of the reference current for closed-loop control of third order harmonic circulating current in the DQ frame.

In some embodiments, the reference voltage generation module 704 compares $I_{3d}$ with $I_{3d\_ref}$ to generate a first DC difference, and compares $I_{3q}$ with $I_{3q\_ref}$ to generate a second DC difference. In order to inject the third order harmonic circulating current into the phase arms for the power extension of converter 110, the phase angles of the third order harmonic circulating current and the fundamental current in the phase arm should be the same when wt=2kπ (k=0, 1, 2 . . . ). To achieve this, $I_{3d\_ref}$ should be set to the desired amplitude Iz, and $I_{3q\_ref}$=0 pu. In some embodiments, Iz=0.167 pu. The reference voltage generation module 704 comprise PI control units and conversion units to generate, based on the first DC difference and the second DC difference, the harmonic voltage signal $U_{abc\_ref}$ for controlling the third order harmonic circulating current to have the pre-defined amplitude in a manner of closed-loop PI control.

It should be noted that, the implementation of the converter controller 102 illustrated in FIG. 7 is merely an exemplary embodiment, and the present disclosure is not limited thereto. In other embodiments, the converter controller 102 may control any order harmonic circulating current in closed-loop manner. In other embodiments, the converter controller 102 may be implemented in any other type of closed-loop PI control.

In other embodiments, the converter controller 102 may be implemented in a manner of closed-loop PR control. In these embodiments, the converter controller 102 is configured to determine first and second AC components of the harmonic current signal from the current signals. The converter controller 102 compares the first AC component with a first reference AC component of the reference current signal to generate a first AC difference, and compares the second AC component with a second reference AC component of the reference current signal to generate a second AC difference. Moreover, the converter controller 102 generates the harmonic voltage signal based on the first AC difference and the second AC difference.

According to the embodiments, the injection of the circulating current can help the delta-connected cascaded multilevel converter to extend the power capacity of converter, with a little or even no modification on the hardware system of the converter. Therefore, the capital cost of the converter can be saved. For example, by using the third order harmonic circulating current control for the converter, the rated power range of the converter can be further extended approximately 15.5% with little or even no modification on the hardware system of the converter. Therefore, the power range extension is obtained with minimum material cost of the converter for the voltage drive application.

Moreover, the voltage fluctuation of the DC capacitor in each converter cell is decreased, which can help to extend the working lifetime of the DC capacitor. The DC capacitor is a main component in the delta-connected cascaded multilevel converter. This life extension of the DC capacitor is very helpful to increase the converter life and decrease the maintenance cost of this converter. Therefore, extended lifetime and reduced maintenance cost of the DC capacitor in each converter cells of the converter are implemented by limiting the voltage fluctuation of DC capacitors.

A simulation model of the delta-connected cascaded multilevel converter is built in MATLAB. Table 1 lists parameters of the simulation model.

TABLE 1

|  | Delta-connected converter |
|---|---|
| Rated Voltage (rms_ph2ph) | 6 kV |
| Rated Power | 5 MVA |
| Power Factor | 0.86 |
| V_trans (Pri/2$^{nd}$; rms_ph2ph) | 1 kV/730 V |
| PEBB number/Drive | 27 |
| PEBB number/Leg | 9 |
| Trans. Phase Shift. | 6.67° |
| PEBB Rated Current (rms) | 277 A |
| PEBB | R8 |
| PEBB DC capacitor | 10.8 mF |
| Arm Inductor | 2 mH |
| Motor load (represented by an constant power RL load) | P = 4 kW; Q = 3 kVar |

Table 2 shows simulation results. $I_{L\_peak}$ represents the peak value of current flowing through the arm inductors, $I_{Z\_peak}$ represents the peak value of the third order harmonic circulating current, and $P_{loss\_arm}$ represents power loss when the arm current flows through a resistance of 1Ω, i.e., $(\int I_L^2 dt)/T$.

TABLE 2

|  | Ideal | Without Conv. Ctrl | With Conv. Ctrl (Iz_Ref = ⅙ pu) |
|---|---|---|---|
| $I_{L\ peak}$ ($I_{Z\ peak}$) | 1.0 pu (0 pu) | 1.13 pu (0.32 pu) | 0.89 pu (0.17 pu) |
| $P_{loss\ arm}$ | 1.0 pu | 1.073 pu | 1.033 pu |

It can be seen that, for the same motor load, with the help of the converter control, the peak value of the current flowing through the arm inductor is decreased from 1.13 pu to 0.89 pu. In this way, the fundamental current of the delta-connected converter can be further increased from 0.89 pu to 1.0 pu, which means about +15% of increase on the rated power of the converter.

For the voltage fluctuation of DC capacitors in each converter cells, the simulation results are shown in Table 3. It can be seen that, the voltage fluctuation is significantly decreased, along with the increase of current amplitude of third order harmonic circulating current reference Iz_ref. Thus, more circulating current injection can help to further decrease the DC voltage fluctuation.

TABLE 3

| | Without | With 3rd Circulating Current Control | |
|---|---|---|---|
| $I_{Z\_Ref}$ | 40.9 V | 21.4 V | 28.5 V |
| $V_{dc\_Peak2peak}$ | 47.1 V | 27.6 V (59%*47.1 V) | 33.5 V (71%*47.1 V) |

Figure 8:
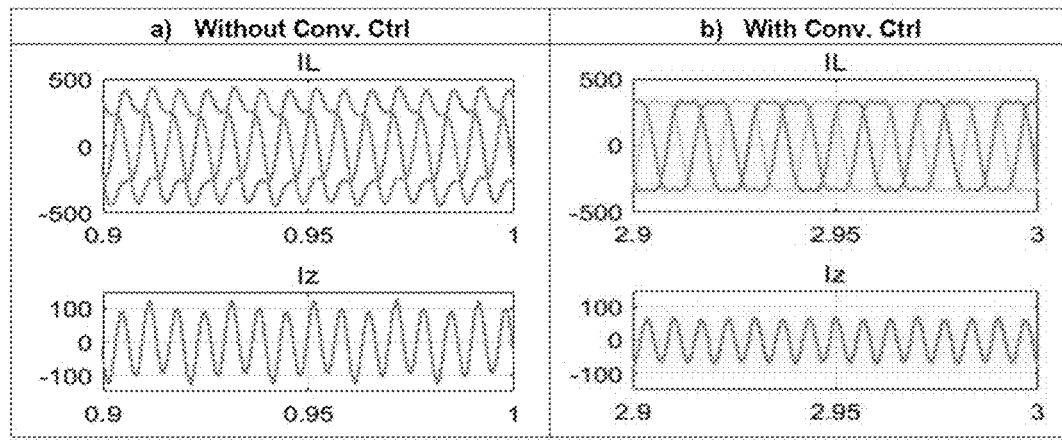
FIG. 8 illustrates graphs showing simulation results with and without a converter controller according to an embodiment of the present disclosure.

FIG. 8 illustrates graphs showing simulation results with and without the converter controller according to an embodiment of the present disclosure. The simulation model of the delta-connected cascaded multilevel converter is built in MATLAB. IL represents the phase currents flowing through the arm inductors, and Iz represent the circulating current. Similar conclusions can also be obtained from FIG. 8, where the peak value of phase current IL in the waveform shown in part (a) of FIG. 8 is much greater than that in part (b) of FIG. 8.

Figure 9:
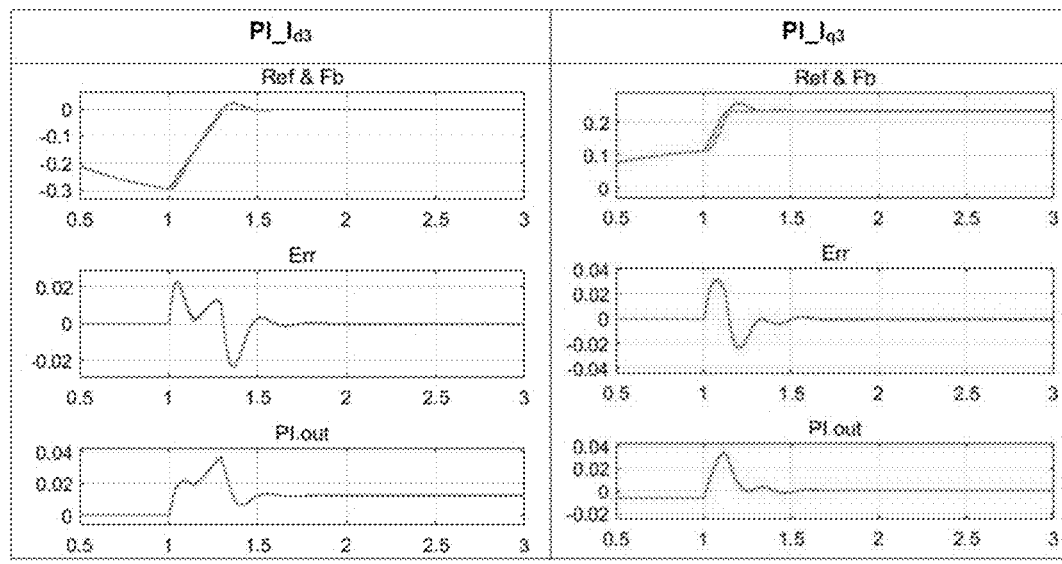
FIG. 9 illustrates graphs showing simulation results of feedbacks of closed-loop control of a converter controller according to an embodiment of the present disclosure.

FIG. 9 illustrates graphs showing simulation results of feedbacks of closed-loop control of the converter controller according to an embodiment of the present disclosure. FIG. 9 shows that the feedback of the closed-loop control can follow the reference signal.

According to the embodiments of the present disclosure, the circulating current control for the converter helps to extend the rated power range of the converter by approximately 15.5% with little or even no modification on the hardware system of the converter. Moreover, the voltage fluctuation of the DC capacitor in each converter cell is decreased, which can help to extend the working lifetime of the DC capacitor. This life extension of the DC capacitor is very helpful to increase the converter life and decrease the maintenance cost of this converter. In this way, the power range extension is obtained with minimum material cost of the converter, and the extend lifetime and reduced maintenance cost of the DC capacitor is implemented in each converter cells of the converter.

Figure 10:
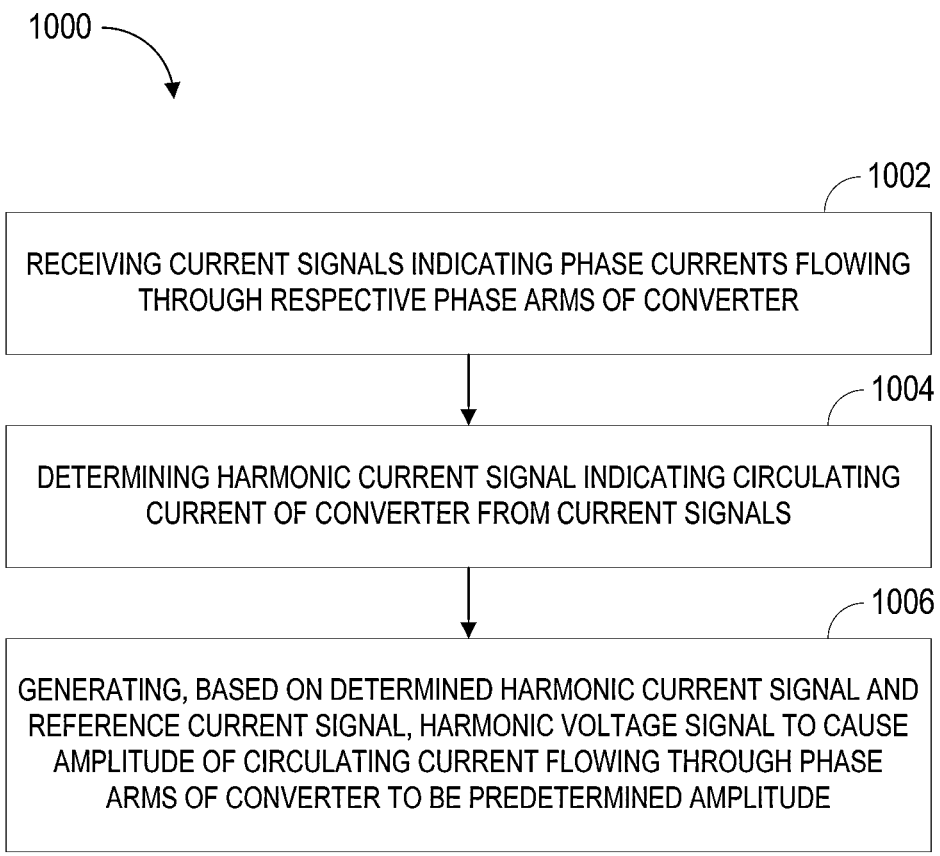
FIG. 10 illustrates a flowchart of a method for controlling a circulating current of a delta-connected cascaded multilevel converter according to an embodiment of the present disclosure.

FIG. 10 illustrates a flowchart 1000 of a method for controlling a circulating current of a delta-connected cascaded multilevel converter according to an embodiment of the present disclosure.

At block 1002, the method comprises receiving current signals indicating phase currents flowing through respective phase arms of the converter.

At block 1004, the method comprises determining a harmonic current signal indicating a circulating current of the converter from the current signals. In some embodiments, first and second DC components of the harmonic current signal are determined from the current signals. In other embodiments, first and second AC components of the harmonic current signal are determined from the current signals.

At block 1006, the method comprises generating a harmonic voltage signal based on the determined harmonic current signal and a reference current signal. The harmonic voltage signal causes an amplitude of the circulating current flowing through the phase arms of the converter to be a predetermined amplitude. In some embodiments, the amplitude of a third order harmonic circulating current is controlled to be 0.167 times of an amplitude of a rated current of the converter.

In some embodiments, the harmonic voltage signal is generated based on a comparison of the harmonic current signal and the reference current signal. In some embodiments, the first DC component is compared with a first reference DC component of the reference current signal to generate a first DC difference, and the second DC component is compared with a second reference DC component of the reference current signal to generate a second DC difference. In some embodiments, the first DC component is compared with an amplitude of 0.167 times of a rated current of the converter, and the second DC component is compared with zero. Further, the harmonic voltage signal is generated based on the first DC difference and the second DC difference.

In other embodiments, the first AC component is compared with a first reference AC component of the reference current signal to generate a first AC difference, and the second AC component is compared with a second reference AC component of the reference current signal to generate a second AC difference. Further, the harmonic voltage signal is generated based on the first AC difference and the second AC difference.

In some embodiments, the method may further comprise receiving a phase voltage reference signal associated with a load electrically coupled to the converter. The method may further comprise generating a control signal by combining the harmonic voltage signal with the phase voltage reference signal. The control signal is used for controlling the converter to cause a peak amplitude of the phase currents to be a first amplitude. The first amplitude is associated with a second amplitude of the circulating current in the phase currents.

In some embodiments, the method may further comprise controlling one of a plurality of converter cells in the phase arm based on a cell control signal generated from the control signal. This control causes the amplitude of the circulating current to be the predetermined amplitude. In some embodiments, the method further comprise receiving a DC voltage value indicating a DC voltage across a capacitor in the one of the plurality of converter cells. The DC voltage value is compared with a nominal value to generate a compensation factor. In some embodiments, the compensation factor is generated by dividing the DC voltage value by the nominal value. Moreover, the one of the plurality of converter cells is controlled based on the generated compensation factor and the cell control signal. In some embodiments, the one of the plurality of converter cells is controlled based on the compensated control signal.

According to another aspect of the present disclosure, a computer readable medium is provided. The computer readable medium comprises instructions stored thereon. The instructions, when executed on at least one processor, cause the at least one processor to carry out the method as described above.

While several details are contained in the above discussions, these should not be construed as limitations on the scope of the subject matter described herein, but rather as descriptions of features that may be specific to particular embodiments. The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but to be accorded the widest scope consistent with the principles and novel features disclosed herein.

What is claimed is:

1. An apparatus for controlling a delta-connected cascaded multilevel converter, comprising:
a converter controller configured to:
receive current signals indicating phase currents flowing through respective phase arms of the converter;
determine a harmonic current signal indicating a circulating current of the converter from the current signals;
generate, based on the determined harmonic current signal and a reference current signal, a harmonic voltage signal to cause an amplitude of the circulating current flowing through the phase arms of the converter to be a predetermined amplitude;
receive a phase voltage reference signal associated with a load electrically coupled to the converter; and
generate, by combining the harmonic voltage signal with the phase voltage reference signal, a control signal for controlling the converter to cause a peak amplitude of the phase currents to be a first amplitude,
wherein the first amplitude is associated with a second amplitude of the circulating current in the phase currents.

2. The apparatus of claim 1, wherein the converter controller is configured to:
determine the harmonic current signal indicating a third order harmonic circulating current of the converter from the current signals; and
generate the harmonic voltage signal to cause the amplitude of the third order harmonic circulating current to be 0.167 times of the amplitude of the rated current of the converter.

3. The apparatus of claim 1, wherein the converter controller is configured to generate the harmonic voltage signal based on a comparison of the harmonic current signal and the reference current signal.

4. The apparatus of claim 3, wherein the converter controller is configured to:
determine a first DC component of the harmonic current signal from the current signals;
compare the first DC component with a first reference DC component of the reference current signal to generate a first DC difference;
determine a second DC component of the harmonic current signal from the current signals;
compare the second DC component with a second reference DC component of the reference current signal to generate a second DC difference; and
generate the harmonic voltage signal based on the first DC difference and the second DC difference.

5. The apparatus of claim 4, wherein the first reference DC component of the reference current is set to be 0.167 times of an amplitude of a rated current of the converter, and the second reference DC component of the reference current is set to be zero.

6. The apparatus of claim 3, wherein the converter controller is configured to:
determine a first AC component of the harmonic current signal from the current signals;
compare the first AC component with a first reference AC component of the reference current signal to generate a first AC difference;
determine a second AC component of the harmonic current signal from the current signals;
compare the second AC component with a second reference AC component of the reference current signal to generate a second AC difference; and
generate the harmonic voltage signal based on the first AC difference and the second AC difference.

7. The apparatus of claim 1, further comprising:
a cell controller configured to control, based on a cell control signal generated from the control signal, one of a plurality of converter cells in the phase arm to cause the amplitude of the circulating current to be the predetermined amplitude.

8. The apparatus of claim 7, wherein the cell controller is further configured to:
receive a DC voltage value indicating a DC voltage across a capacitor in the one of the plurality of converter cells;
compare the DC voltage value with a nominal value to generate a compensation factor; and
control the one of the plurality of converter cells based on the generated compensation factor and the cell control signal.

9. The apparatus of claim 8, wherein the cell controller is configured to generate the compensation factor by dividing the DC voltage value by the nominal value.

10. The apparatus of claim 9, wherein the cell controller is configured to:
determine a compensated control signal by dividing a level of the cell control signal by the compensation factor; and
control the one of the plurality of converter cells based on the compensated control signal.

11. A system for controlling a delta-connected cascaded multilevel converter, comprising:
the apparatus of claim 1;
a first controller configured to generate a phase voltage reference signal based on a load electrically coupled to the converter; and
a second controller configured to generate a plurality of cell control signals for the plurality of converter cells based on the harmonic voltage signal.

12. A method for controlling a delta-connected cascaded multilevel converter, comprising:
receiving current signals indicating phase currents flowing through respective phase arms of the converter;
determining a harmonic current signal indicating a circulating current of the converter from the current signals;
generating, based on the determined harmonic current signal and a reference current signal, a harmonic voltage signal to cause an amplitude of the circulating current flowing through the phase arms of the converter to be a predetermined amplitude;
receiving a phase voltage reference signal associated with a load electrically coupled to the converter; and
generating, by combining the harmonic voltage signal with the phase voltage reference signal, a control signal for controlling the converter to cause a peak amplitude of the phase currents to be a first amplitude,
wherein the first amplitude is associated with a second amplitude of the circulating current in the phase currents.

13. The method of claim 12, wherein determining the harmonic current signal indicating the circulating current comprises determining the harmonic current signal indicating a third order harmonic circulating current, and
wherein generating the harmonic voltage signal to cause the amplitude of the circulating current to be the predetermined amplitude comprises generating the harmonic voltage signal to cause the amplitude of the third order harmonic circulating current to be 0.167 times of the amplitude of the rated current of the converter.

14. The method of claim 12, wherein generating the harmonic voltage signal comprises generating the harmonic voltage signal based on a comparison of the harmonic current signal and the reference current signal.

15. The method of claim 14, wherein generating the harmonic voltage signal based on the comparison comprises:
determining a first DC component of the harmonic current signal from the current signals;
comparing the first DC component with a first reference DC component of the reference current signal to generate a first DC difference;
determining a second DC component of the harmonic current signal from the current signals;
comparing the second DC component with a second reference DC component of the reference current signal to generate a second DC difference; and
generating the harmonic voltage signal based on the first DC difference and the second DC difference.

16. The method of claim 15, wherein comparing the first DC component with the first reference DC component comprises comparing the first DC component with an amplitude of 0.167 times of a rated current of the converter, and
wherein comparing the second DC component with the second reference DC component comprises comparing the second DC component with zero.

17. The method of claim 14, wherein generating the harmonic voltage signal based on the comparison comprises:
determining a first AC component of the harmonic current signal from the current signals;
comparing the first AC component with a first reference AC component of the reference current signal to generate a first AC difference;
determining a second AC component of the harmonic current signal from the current signals;
comparing the second AC component with a second reference AC component of the reference current signal to generate a second AC difference; and
generating the harmonic voltage signal based on the first AC difference and the second AC difference.

18. The method of claim 12, further comprising:
controlling, based on a cell control signal generated from the control signal, one of a plurality of converter cells in the phase arm to cause the amplitude of the circulating current to be the predetermined amplitude.

19. The method of claim 18, further comprising:
receiving a DC voltage value indicating a DC voltage across a capacitor in the one of the plurality of converter cells;
comparing the DC voltage value with a nominal value to generate a compensation factor; and
controlling the one of the plurality of converter cells based on the generated compensation factor and the cell control signal.

20. The method of claim 19, wherein generating the compensation factor comprises generating the compensation factor by dividing the DC voltage value by the nominal value.

21. The method of claim 20, wherein controlling the one of the plurality of converter cells comprises:
determining a compensated control signal by dividing a level of the cell control signal by the compensation factor; and
controlling the one of the plurality of converter cells based on the compensated control signal.

22. A non-transitory computer readable medium having instructions stored thereon, the instructions, when executed on at least one processor, causing the at least one processor to carry out the method of claim 12.

23. An apparatus for controlling a delta-connected cascaded multilevel converter, comprising:
a converter controller configured to:
receive current signals indicating phase currents flowing through respective phase arms of the converter;
determine a harmonic current signal indicating a circulating current of the converter from the current signals;
generate, based on the determined harmonic current signal and a reference current signal, a harmonic voltage signal to cause an amplitude of the circulating current flowing through the phase arms of the converter to be a predetermined amplitude;
determine a first DC component of the harmonic current signal from the current signals;
compare the first DC component with a first reference DC component of the reference current signal to generate a first DC difference;
determine a second DC component of the harmonic current signal from the current signals;
compare the second DC component with a second reference DC component of the reference current signal to generate a second DC difference; and
generate the harmonic voltage signal based on the first DC difference and the second DC difference,
wherein the converter controller is configured to generate the harmonic voltage signal based on a comparison of the harmonic current signal and the reference current signal.

24. A method for controlling a delta-connected cascaded multilevel converter, comprising:
receiving current signals indicating phase currents flowing through respective phase arms of the converter;
determining a harmonic current signal indicating a circulating current of the converter from the current signals;
generating, based on the determined harmonic current signal and a reference current signal, a harmonic voltage signal to cause an amplitude of the circulating current flowing through the phase arms of the converter to be a predetermined amplitude;
controlling, based on a cell control signal generated from the control signal, one of a plurality of converter cells in the phase arm to cause the amplitude of the circulating current to be the predetermined amplitude;
receiving a DC voltage value indicating a DC voltage across a capacitor in the one of the plurality of converter cells;
comparing the DC voltage value with a nominal value to generate a compensation factor; and
controlling the one of the plurality of converter cells based on the generated compensation factor and the cell control signal,
wherein generating the compensation factor comprises generating the compensation factor by dividing the DC voltage value by the nominal value.

* * * * *